Sept. 19, 1961      D. R. TOMKO      3,000,481

HELICAL COIL TYPE CLUTCHES

Filed April 23, 1958

INVENTOR.
DONALD R. TOMKO
BY George M. Soule
ATTORNEY

United States Patent Office 3,000,481
Patented Sept. 19, 1961

3,000,481
HELICAL COIL TYPE CLUTCHES
Donald M. Tomko, Cleveland, Ohio, assignor to Curtiss-Wright Corporation, a corporation of Delaware
Filed Apr. 23, 1958, Ser. No. 730,475
3 Claims. (Cl. 192—48)

This invention relates to a helical coil or so-called spring clutch having provision for allowing slippage in or between the input or drive shaft and the ultimate output or driven shaft or member during acceleration from stopped position or in event of overload. Whenever the load applied to a spring or coil clutch of common type has considerable inertia or high friction, rotation of it from arrested position is necessarily accompanied by considerable shock to the spring clutch mechanism and associated components because the speed of the load must be accelerated from zero up to running speed or that of the input to the clutch in a few milliseconds. The present improvement enables material extension of the acceleration period, up to several seconds, without reduction of rated torque capacity of the main helical spring element of the clutch and its coacting drums. This is enabled by employing in series with known or conventional spring clutch assembly elements a stiff or low index free floating helical spring and cooperating drums but wherein the coils of the spring are wound in the normally overrunning direction. "Free floating" as applied to spring clutches means that the spring is attached to its associated drum solely through its preloading thereon. When a spring is wound in the overrunning direction the slip or load-rejection point is approximately independent of changes in coefficient of the friction between the spring and drum surfaces, the slip point being approximately the same for static as for dynamic friction. The invention further provides a design of the slip portion of the clutch such that slippage occurs always on a clutch drum member lying intermediately of input and output clutch drum members of the assembly.

Various objects and novel features of the invention not indicated above will become apparent from the following description of the preferred form shown herewith. The essential characteristics are summarized in the claims.

Figure 1:
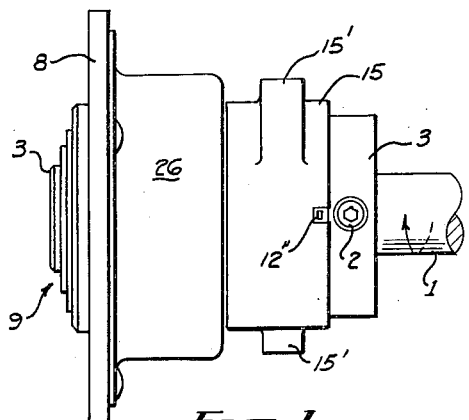
Figure 3:
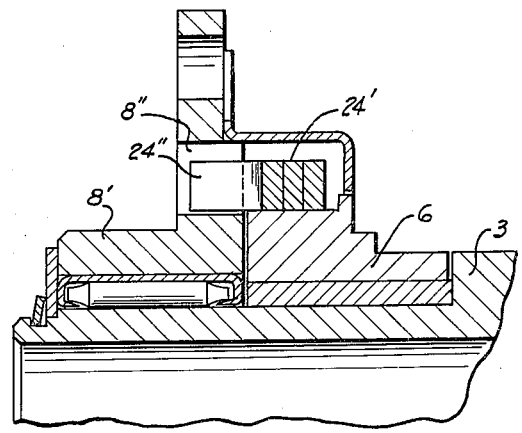
Figure 2:
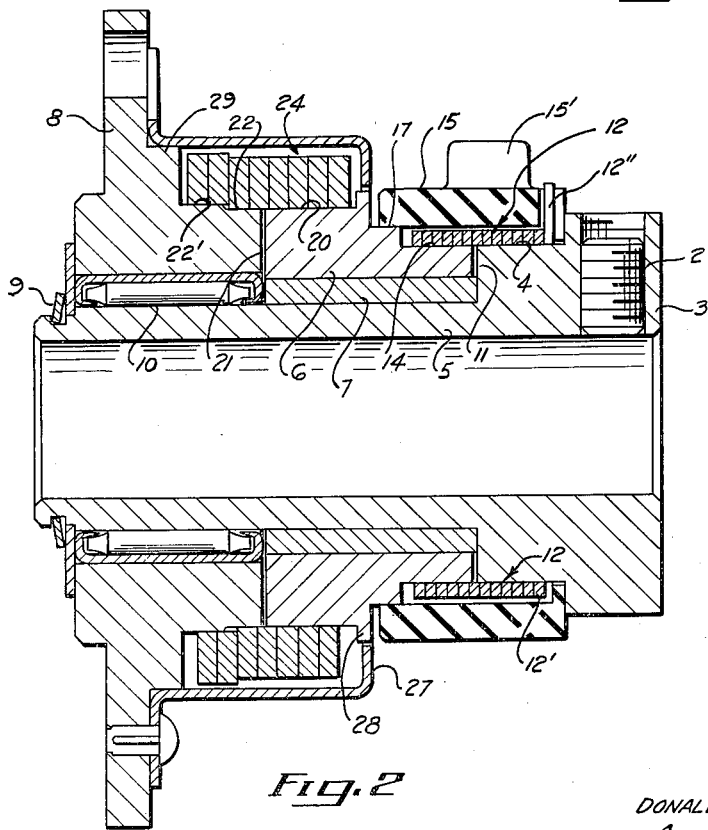

In the drawing, FIG. 1 is a full size side elevational view of the present clutch mechanism. FIG. 2 is a relatively enlarged generally sectional longitudinal assembly view of the mechanism. FIG. 3 is a fragmentary sectional view similar to FIG. 2, showing a modified auxiliary or overrunning-wound spring anchorage.

In FIG. 1 the drive shaft 1 extends into and is secured, as by a screw 2, to a shaft adapter 3, FIG. 2, which serves as an input drum member of the present mechanism via drum surface 4. Member 3 has a reduced diameter tubular extension 5 on which is journalled for rotation independently of member 3 an intermediate dual clutch drum member 6 as on a suitable bearing bushing 7 between the tubular portion 5 and the main body of drum member 6. A third drum member 8 is also freely journalled on the reduced diameter tubular portion 5 of the shaft adapter as by a bearing 10 (preferably needle bearing). The three drum members 3, 6 and 8 are secured axially in free running condition or position as by a retainer ring and washer assembly 9. Axially adjacent surfaces of the drum members 3 and 6 at the crossover region indicated at 11 are maintained in spaced relationship by the bearing bushing 7 which is pressed into the bore of intermediate drum member 6 so as to extend slightly from the right end of the bore for contact with the relatively adjacent axially facing surface of the shaft adapter 3.

Main driving normally wound self-energizing clutch spring 12 bridges across from drum surface 4 of the shaft adapter 3 to drum surface 14 of intermediate drum 6; and the spring is in interference fitting or preloaded relationship to the surfaces 4 and 14 and is free floating, or is not otherwise attached to the drum members. The normally self-energizing spring 12 is deenergized by blocking rotation of its input end coil 12' having a radially outwardly extending toe portion 12''. The toe portion extends into a slot 16 of a stop or arresting sleeve 15 supported for example as on a cylindrical surface 17 formed on the intermediate drum member 6. All the above described construction associated with clutch spring 12 is preferably as shown and more fully described in the application of C. R. Sacchini and D. R. Tomko, Serial No. 637,239 filed January 30, 1957, now Patent No. 2,968,380, granted January 17, 1961.

In the Sacchini et al. application a counterpart of intermediate drum element or member 6 hereof serves as the ultimate output member of the clutch mechanism, being connected directly with an element of mechanism to be turned intermittently as by a continuously rotating shaft such as 1 hereof. Sleeve 15 for deactuation of the present clutch can be controlled automatically or manually as by any suitable pawl or plunger arrangement (not shown) engageable with and disengageable from shoulders formed on projections 15' on the sleeve 15. When the sleeve 15 is arrested from turning, the coils of the spring 12 which are associated with the input drum surface 4 are maintained by the connected load and the arrested sleeve in spaced relationship to the drum surface 4 so as not to rub on the input drum member during the idle periods of the driven mechanism.

As previously mentioned, when the control sleeve 15 is released from its deactuating pawl or plunger the entire load connected as with intermediate clutch drum member 6 must be accelerated suddenly to the speed of the drive shaft 1 in a small fraction of a second because, as is well known, a clutch spring mechanism as thus far described is in effect positively acting or inherently unstable and has no capacity for predeterminable slipping within the designed capacity of the clutch. Intermediate drum member 6 has an external drum surface 20, and output drum member 8 has a similar but preferably stepped drum surface 22 at relatively opposite sides of crossover region 21 between the two approximately equal diameter drum surfaces. Bridging the drum surfaces 20 and 22 is a free floating relatively low index auxiliary clutch spring 24 wound in the overrunning direction in relation to the normal torque transmitting direction of the clutch, being wound opposite hand in relation to clutch spring 12. "Spring index" is a ratio, namely the mean diameter of the clutch spring to the wire height or radial dimension of the spring stock. For the direction of rotation indicated by arrow on FIG. 1, main driving clutch spring 12 is left hand wound and auxiliary clutch spring 24 is right hand wound. Spring 24 is preloaded on the drum surfaces 20 and 22 for transmission of torque in the overrunning direction from drum 6 to drum 8 but so as to transmit considerably greater torque to the load than the rated torque capacity of the main clutch mechanism 4, 12, 14. For example if the rated capacity of the clutch mechanism just mentioned is 40 lb. in. at driving motor speed, auxiliary spring 24 will be designed to slip on drum surface 20 at a minimum of 50 to 60 lb. in. A highly satisfactory manner of making certain that the slippage of clutch spring 24 will be on the drum surface 20 of the intermediate clutch member 6 is to provide a relatively greater preloading of coils of the auxiliary spring 24 on the output drum surface 22, and this as shown is accomplished by the step 22' of drum surface 22, whereby, if the clutch spring 24 is wound as a simple cylinder, its coils will inherently have a higher preloading on the stepped drum surface 22' than on the intermediate drum surface 20.

Since, in conventional construction, the intermediate drum member 6 and the overrunning-wound auxiliary clutch spring 24 will be relatively hard steel, the drum surface 20 and/or internal gripping surfaces of spring 24 are preferably treated as by application of lubricant containing molybdenum disulphide or equivalent material to prolong surface life and to reduce objectionable noise during temporary overrun in rejecting overload torque. In operation, the clutch mechanism hereof functions as usual in the case of single revolution controlled spring clutches except for the emergency and acceleration shock absorbing operation of the overrunning wound low index auxiliary clutch spring 24 whose operation has already been explained.

For reasons fully explained in the Sacchini et al. application above identified, it is important that after release of the main driving clutch spring 12, via stopping of the sleeve 15, that coasting of the load to a stop shall maintain the coils of the main or drive spring 12 associated with input drum 4 clear of that drum in order to avoid fretting corrosion and wear between the drive spring and that drum as the driving motor continues to rotate. The present slip clutch arrangement insures that, after such release, the intermediate drum 6 will be carried around with the load-connected or output drum 8 because auxiliary overrunning wound spring 24 then acts in the "normal" clutching direction positively to couple the output drum 8 to the intermediate drum 6. In other words the driven or output drum 8 drives the intermediate drum through the auxiliary clutch spring 24 in the true spring clutching direction during the operation of unlocking the clutch.

Since any amount of lubrication may be supplied to the overrunning spring clutch couple comprised of auxiliary spring 24 and drum surfaces 20 and 22 without materially changing the load rejecting or slip point, it is desirable to provide a permanent supply of lubrication, and suitable lubricant is preferably contained within a shell such as 26 having a flange portion 27 lying close to an axial spring retaining shoulder rib 28 or drum member 6, the shell being in tight sealing engagement with a stepped cylindrical shoulder 29 about the output drum member 8 and suitably secured to that drum member as by a series of rivets or other suitable fasteners.

In the construction according to FIG. 3, the input and intermediate clutch members 3 and 6, and a full floating clutch spring 12 (not shown) and a control sleeve 15 (not shown), are the same as in FIG. 2, but instead of the step 22' on member 6 of FIG. 2 the auxiliary spring 24' has a bent-out toe or lug portion 24" anchoring the spring to output member 8' at an axial opening or socket 8" therein. This represents a typical single drum coil clutch construction which is not as satisfactory as one using two drums as in FIG. 2 since the toe 24" has to transmit maximum torque in operation. The spring 24' is, of course, free floating on drum surface 20 of member 6.

The present clutch has, of course, many applications: common ones being drive for lawn mowers and domestic appliances such as washing machines, dryers and the like, and is especially adapted to any application having a large inertia load presenting an acceleration shock problem upon actuation of the clutch.

I claim:
1. A torque limiting spring or coil clutch mechanism comprising an input drum, an output drum and an intermediate drum, all in axial alignment, two helical clutch springs, one in preloaded self-energizing full floating relationship to the input and intermediate drums and the other in preloaded self-energizing relationship to the intermediate drum and connected to the output drum to turn therewith, and means operative to deenergize coils of said one spring associated with the input drum to render the mechanism ineffective to transmit torque from the input to the output drum in one direction, said other spring having a low index relative to that of said one spring and being helically wound oppositely thereof or in an overrunning direction so as to limit the torque transmissible from the input drum to the output drum.

2. A helical coil clutch mechanism comprising an input drum, an output drum and an intermediate drum supported coaxially for relative rotation, a normally wound helical clutch spring in bridging and preloaded relationship to the input drum and intermediate drum, a normally overrunning wound helical spring preloaded in bridging relation to the intermediate drum and the output drum, and means operative to render the first mentioned spring active and inactive to transmit torque, characterized in that the second mentioned spring has a low index and high preloaded relationship to the intermediate drum and output drum as compared to the index and preloading of the first mentioned spring on its associated drums.

3. A torque limiting coil clutch mechanism comprising an input drum, an output drum and an intermediate drum, all in axial alignment, two full floating helical clutch springs respectively in preloaded self-energizing bridging relationship to the input and output drums and each in preloaded self-energizing relationship to the intermediate drum, the springs being otherwise unconnected to the associated drums, means operative to deenergize coils of the spring associated with the input drum to render the mechanism ineffective to transmit substantial torque from the input to the output drum in one direction, the spring associated with the output drum and intermediate drum having a low index relative to that of the input-drum-associated spring and being helically wound oppositely thereof so as to be capable of overrunning hence torque limiting slippage under shock loading, the low index spring being more heavily preloaded on the output drum than on the intermediate drum so that the overrunning slippage occurs only on the intermediate drum.

References Cited in the file of this patent

UNITED STATES PATENTS

| | | |
|---|---|---|
| 1,641,418 | Elsey | Sept. 6, 1927 |
| 2,098,021 | Wheeler | Nov. 2, 1937 |
| 2,242,379 | Wahl | May 20, 1941 |
| 2,302,312 | Greenlee et al. | Nov. 17, 1942 |
| 2,575,012 | Harvey | Nov. 13, 1951 |
| 2,643,750 | Moulton | June 30, 1953 |
| 2,660,899 | McCammon | Dec. 1, 1953 |
| 2,685,949 | Dunlap | Aug. 10, 1954 |
| 2,829,748 | Sacchini et al. | Apr. 8, 1958 |